United States Patent [19]

Haruki et al.

[11] Patent Number: 4,632,252

[45] Date of Patent: Dec. 30, 1986

[54] MAIL SORTING SYSTEM WITH CODING DEVICES

[75] Inventors: Kazuhito Haruki, Kanagawa; Masanori Iwamoto, Tokyo; Masuo Tamada, Kanagawa, all of Japan

[73] Assignee: Kabushiki Kaisha Toshiba, Japan

[21] Appl. No.: 690,965

[22] Filed: Jan. 14, 1985

[30] Foreign Application Priority Data

Jan. 12, 1984 [JP] Japan .................................. 59-4024

[51] Int. Cl.[4] .......................... B07C 1/00; B07C 3/20
[52] U.S. Cl. .................................... 209/546; 209/584; 209/900; 364/478; 382/1; 382/57
[58] Field of Search ................................. 209/3.1-3.3, 209/546, 547, 569, 583, 584, 900; 101/2; 340/825.3; 382/1, 57; 364/146, 181, 188, 189, 478; 400/103; 235/462, 463; 358/903; 414/136

[56] References Cited

U.S. PATENT DOCUMENTS

| | | | |
|---|---|---|---|
| 3,271,738 | 9/1966 | Kamentsky | 382/57 |
| 3,582,884 | 6/1971 | Shepard | 340/825.3 |
| 4,068,212 | 1/1978 | Templeton | 382/57 |

FOREIGN PATENT DOCUMENTS

| | | | |
|---|---|---|---|
| 0066186 | 12/1982 | European Pat. Off. | 209/900 |
| 2945386 | 5/1980 | Fed. Rep. of Germany | 209/584 |
| 53-76631 | 7/1978 | Japan | 382/1 |
| 2066018 | 7/1981 | United Kingdom | |

OTHER PUBLICATIONS

"*A New Postal Technique: Video Coding*", M. Bordes, L'Echo des Recherches, No. 78, pp. 42-49, Oct. 1974.
Candian Electronics Engineering, vol. 20, No. 11, pp. 20-22, Nov. 1976.
Toshiba Review, No. 118, pp. 5-10, Nov.-Dec. 1978.

*Primary Examiner*—David A. Scherbel
*Assistant Examiner*—Edward M. Wacyra
*Attorney, Agent, or Firm*—Banner, Birch, McKie & Beckett

[57] ABSTRACT

A mail sorting system is provided which includes a plurality of mail sorters and coding devices. These mail sorters and coding devices are selectively coupled together by a distributor so that any coding device can be coupled to any mail sorter. When a mail sorter cannot identify the zip code of a particular piece of mail, the unrecognized address image is transferred to one of the coding devices so that the correct address can be input by an operator. An assigning controller is connected to the distributor for determining which coding device should receive the unrecognized address image in accordance with the current mail processing capability of the mail sorters and coding devices in order to maximize the mail handling capability of the mail sorting system.

4 Claims, 16 Drawing Figures

| READ TIME | MAIL SERIAL NUMBER | DESTINATION CODE (OR REJECT CODE) |
|---|---|---|

| RT | MSN | SORTER NUMBER | IMAGE DATA |
|---|---|---|---|

| RT | MSN | SN | CODING DEVICE NUMBER | IMAGE DATA |
|---|---|---|---|---|

| RT | MSN | SN | CDN | INPUT CODE |
|---|---|---|---|---|

| SN | CDN |
|---|---|

MAIL SORTING SYSTEM WITH CODING DEVICES

BACKGROUND OF THE INVENTION

This invention relates to a mail sorting system, more particularly, a mail sorting system provided with a plurality of mail sorters and coding devices.

Various types of automatic mail sorting devices have been proposed in order to save labor in mailing services. One known type of mail sorter is described, for example, in European Patent Application EP No. 0 066 186. This mail sorter includes a reading device for obtaining a zip code image or an address printed on postal matter such as letters, cards or periodical mail, a recognition unit for determining the destination of the postal matter upon recognition of the image and a sorting device for delivering the postal matter to stacking bins on sorting shelves in accordance with the destination determined by the recognition unit.

Another type of known mail handling device uses coding equipment as described, for example, in British Pat. No. GB 2 066 018. This coding equipment includes the reading device described above for obtaining images of the postal matter but does not include a recognition unit. Instead, one or more coding stations or coding devices are provided which comprise a monitor and keyboard. Successive images are displayed on the monitor so that the operator, upon watching the monitor, can input the proper zip code or area code on the keyboard.

The described coding equipment is more reliable than the formerly described sorting devices because available recognition units cannot yet get a recognition rate of 100%. When recognition units cannot recognize the zip code, the mail is rejected and delivered to a special stacking bin, which must be manually sorted at a later time. However, the disadvantage of coding equipment is that it requires more labor and can sometimes attain less performance than sorting devices with recognition units.

In recent years, with the large increase in the amount of mail, mail sorting machines that can handle large quantities of mail without much labor are desired. One proposed solution has been to install several mail sorters and operate them in parallel. However, in such a parallel system, the amount of rejected mail in each mail sorter increases and different types of rejections occur in different mail sorters. Also, over time, variations in the amount of mail handled by each sorter occur in response to the quality of zip code or address information.

SUMMARY OF THE INVENTION

The object of the present invention is to provide a mail sorting system with improved sorting efficiency and which requires less labor.

Another object of the invention is to provide a mail sorting system with coding devices which are capable of sorting a large amount of mail irrespective of variations in the amount of rejected or unrecognized mail over time.

According to the invention, a mail sorting system is provided which includes a plurality of mail sorters and a plurality of coding devices. Each mail sorter includes a recognition unit which occasionally fails to recognize zip code or address information. Each coding device includes a display device and a keyboard. A distributor, which has a plurality of file units corresponding to the mail sorters, is connected between mail sorters and coding devices.

When a recognition unit in a mail sorter fails to recognize zip code or address information, the rejected image is supplied to the file unit in the distributor corresponding to the mail sorter. The distributor is further provided with an assigning controller and a memory which stores control tables. The control tables contain supervising information about the mail sorters and coding devices such as the frequency and number of rejections by each recognition unit and the processing condition of the coding devices. The assigning controller identifies a coding device where the rejected image in the file unit should be transferred using the control tables. The distributor then transfers the rejected image to a selected coding device. The coding device displays the rejected image on the display device so that the operator can enter corrected data, such as the correct zip code or address, on the keyboard. The distributor supplies the corrected data to a mail sorter so that mail rejected by a particular recognition unit can be automatically delivered to a sorting device.

Since there is no fixed relation between mail sorters and coding devices in the mail sorting system of the present invention, this system makes it possible to deal with variations in load over time. Even when a concentration of rejected images occurs in a particular mail sorter, the mail can be coded by several coding devices in parallel to prevent a so-called 'overflow' state. Thus, the overall sorting efficiency of the mail sorting system of the present invention is greatly improved. Furthermore, the number of coding devices can be kept to the minimum number necessary for the system because contrary to prior mail sorting systems in which each sorter has one or more exclusive coding devices, there is no fixed relationship between the mail sorters and coding devices in the present mail sorting system.

DETAILED DESCRIPTION OF PREFERRED EMBODIMENT

Figure 1:
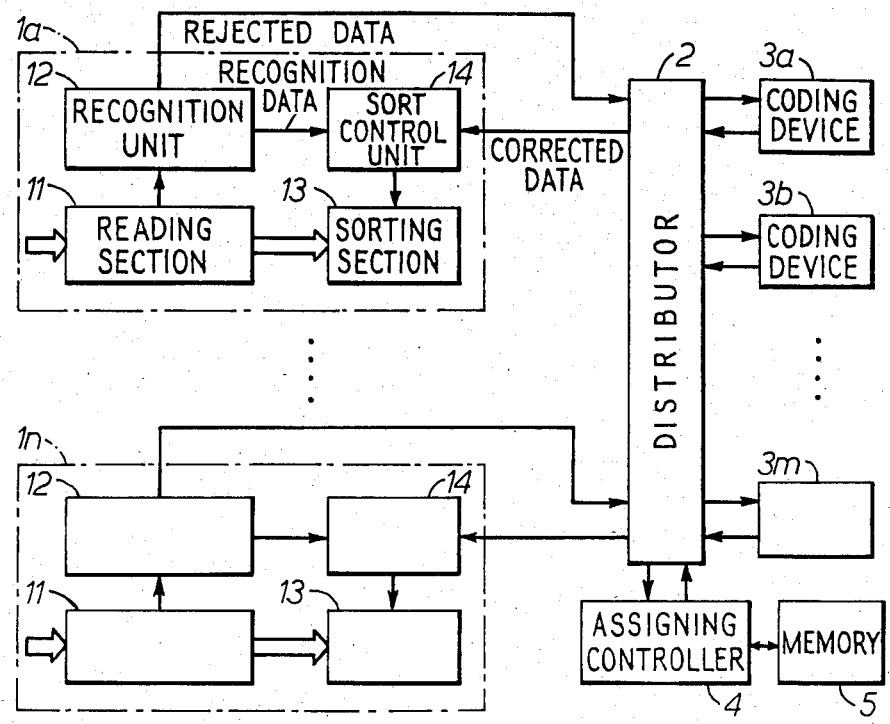
FIG. 1 is a block diagram showing a preferred embodiment of the invention.

FIG. 1 shows a block diagram of the mail sorting system of the preferred embodiment of the present invention. The mail sorting system includes a plurality of mail sorters 1a, 1b, . . . , 1n and a plurality of coding devices 3a, 3b, . . . , 3m. Distributor 2 is provided for transferring data between mail sorters 1 and coding devices 3. Assigning controller 4, which is connected to distributor 2, enables distributor 2 to select the appropriate control device to which data should be transferred using tables stored in memory 5.

Each mail sorter includes reading device or section 11 which scans postal mail to read the zip code or address printed or handwritten on the mail. Reading section 11 is a conventional reading device except for waiting path 115, which is described in further detail below. Recognition unit 12 is a conventional recognition unit that recognizes each number or character forming the zip code from the image data obtained by reading section 11. Sorting device or section 13 is a conventional sorting device that has a plurality of stacking bins (not shown) corresponding to destinations defined by zip code. Sort control unit 14 controls gates (not shown) provided in each stacking bin to deliver the mail to the designated stacking bin in accordance with the zip code recognized by the recognition unit. The zip code indicates not only wide area codes but also more detailed area codes such as the city, town, ward, etc.

Figure 2:
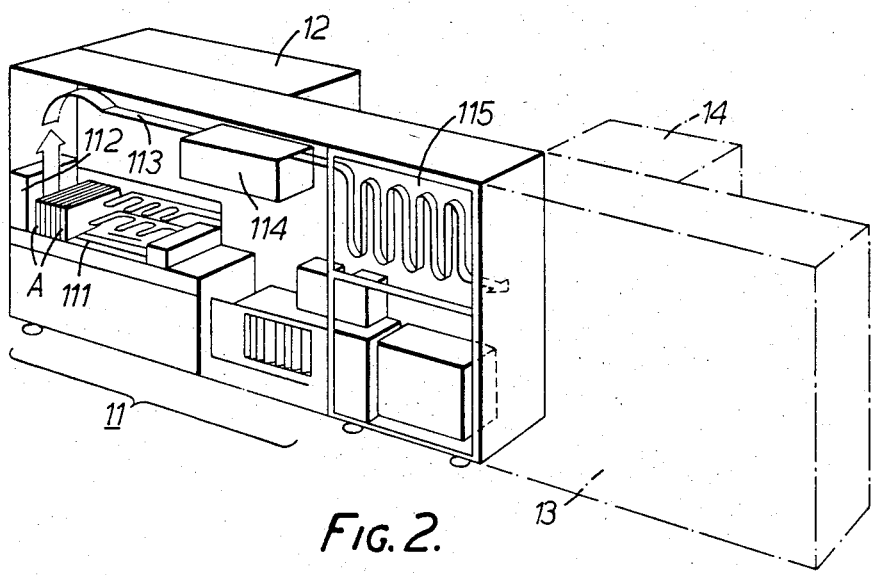
FIG. 2 is a perspective view showing one of mail sorters 1a to 1n in FIG. 1.

FIG. 2 is a perspective view of one of the mail sorters. Stacks of postal matter such as cards and letters are placed vertically in feeding device 111 and sequentially fed one at a time by feeder 112. Each piece of mail A is conveyed along conveyance path 113, which can include a conveyance belt, to conventional reading unit 114. Reading unit 114 includes an optical scanning system (not shown), such as CCD sensor device, which obtains image data of mail A. The image data is supplied to recognition unit 12. After the mail passes through reading unit 114, it enters waiting path 115, which is a rather longer conveyance path that delays the mail for several seconds before it is conveyed to sorting section 13. The delay is provided to make sure enough time elapses for the coding device to supply sorting control unit 14 with a corrected zip code when recognition unit 12 cannot recognize the zip code of mail A.

Figures 3A, 3B, 3C, 3D, 3E, 4:
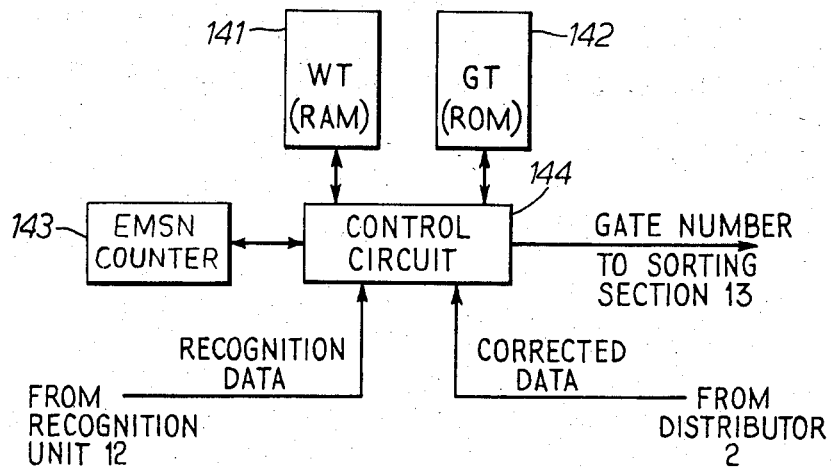
FIGS. 3A through 3E show data formats used in the embodiment of FIG. 1.
FIG. 4 is an example of sort control unit 14 in FIG. 1.

Recognition unit 12 recognizes each character or number of the zip code from the image data supplied by reading unit 114, and then outputs certan recognition data to sort control unit 14 in the format shown in FIG. 3A which includes a designation code, reading time (RT) and mail serial number (MSN), the latter two of which are determined by reading unit 114. For many reasons, such as noise, smudges or stains on the mail, etc., no known recognition unit can recognize zip codes or mail at a rate of 100%, although the rate of rejection is less than several percent. Therefore, according to the preferred embodiment, recognition unit 12 supplies rejected data to distributor 2 in the format shown in FIG. 3B when mail is rejected by the recognition unit. The rejected data includes not only reading time (RT) and mail serial number (MSN), but also unrecognized image data. At the same time rejected data is supplied to distributor 2, recognition unit 12 supplies recognition data to sorting control unit 14 wherein the recognition data contains a destination code which is a specific code indicating that the destination is uncertain.

Upon receiving the rejected data, distributor 2 selects one of coding devices 3a, 3b, . . . , 3n, which are conventional coding devices each having a CRT display (not shown) for displaying the rejected image and a keyboard (not shown) for inputting the correct zip code. Distributor 2 generates transfer data in the format shown in FIG. 3C. When the operator watches the rejected image on the CRT display and inputs the correct zip code, the coding device generates corrected data in the format shown in FIG. 3D, including the correct zip code as the input code, and supplies the corrected data to distributor 2. Distributor 2 transfers the corrected data to sorting control unit 14.

FIG. 4 is a block diagram showing an example of sorting control unit 14 of FIG. 1. Unit 14 includes random access memory 141 storing waiting table WT, read only memory 142 storing gate table GT, counter 143 and control circuit 144. The waiting table WT is formed of a plurality of recognition data successively supplied by recognition unit 12. Gate table GT indicates the relation between the zip code and the corresponding gate number assigned to each gate of the stacking bin. The content of counter 143 is the earliest mail serial number EMSN indicating the earliest mail to arrive at sorting section 13.

Figure 5:
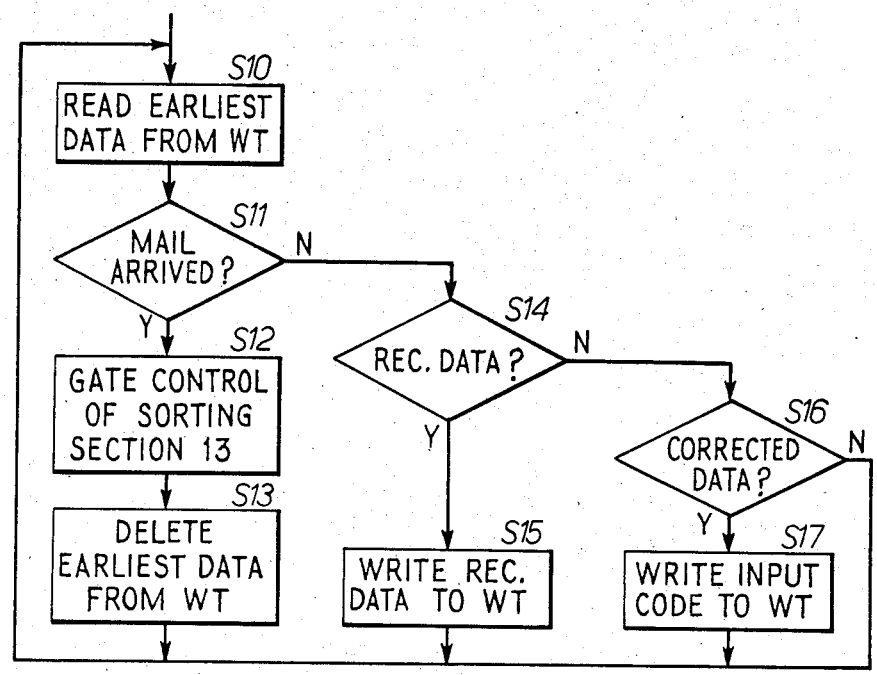
FIG. 5 is a flow chart showing the operation of sort control unit 14 in FIG. 4.

FIG. 5 is a flow chart showing the operation of control circuit 144 in FIG. 4. At step S10, control circuit 144 reads the waiting table WT in random access memory 142 to obtain recognition data corresponding to the earliest mail. Step S10 is carried out by first obtaining the EMSN from counter 143 and searching the recognition data in memory 141 for a mail serial number MSN coinciding with the EMSN. Since it takes several seconds for mail to pass through waiting path 115 as noted above, the read time RT of the earliest recognition data is compared with present time at step S11. If the difference between the read time and the present time is beyond the time required for mail to pass through waiting path 115 at step S12, control circuit 144 instructs the gates of sorting section 13 by first reading the gate number from gate table GT in ROM 142, supplying the destination code of the earliest mail recognition data and then supplying the gate number to sorting section 13. Sorting section 13, upon receiving the gate number, opens the corresponding gate to deliver the earliest mail to the designated stacking bin. The details of a typical sorting section for carrying out the above functions is disclosed for example in European Patent Application EP No. 0 066 186. Lastly, at step S13, control circuit 144 accesses memory 141 to erase the earliest recognition data from waiting table WT, enables counter 143 to count up by 1 for the next mail and returns to step S10.

If the earliest mail has not arrived at sorting section 13 at step S11, at step S14, control circuit 144 checks whether recognition data has been supplied. When recognition data is supplied from recognition unit 12, control circuit 144 writes this data into the waiting table WT at step S15 and returns to step S10. When recognition data is not supplied, at step S16, control circuit 144 checks whether corrected data has been supplied from distributor 2. If recognition data has been supplied, control circuit 144 searches for recognition data whose MSN coincides with the corrected data, and writes the input code of the corrected data as a destination code of the coincident recognition data. Thus, the rejected code is replaced by a corrected zip code input by an operator at one of the coding devices. If corrected data is not supplied, control circuit 144 returns to step S10.

Figure 6:
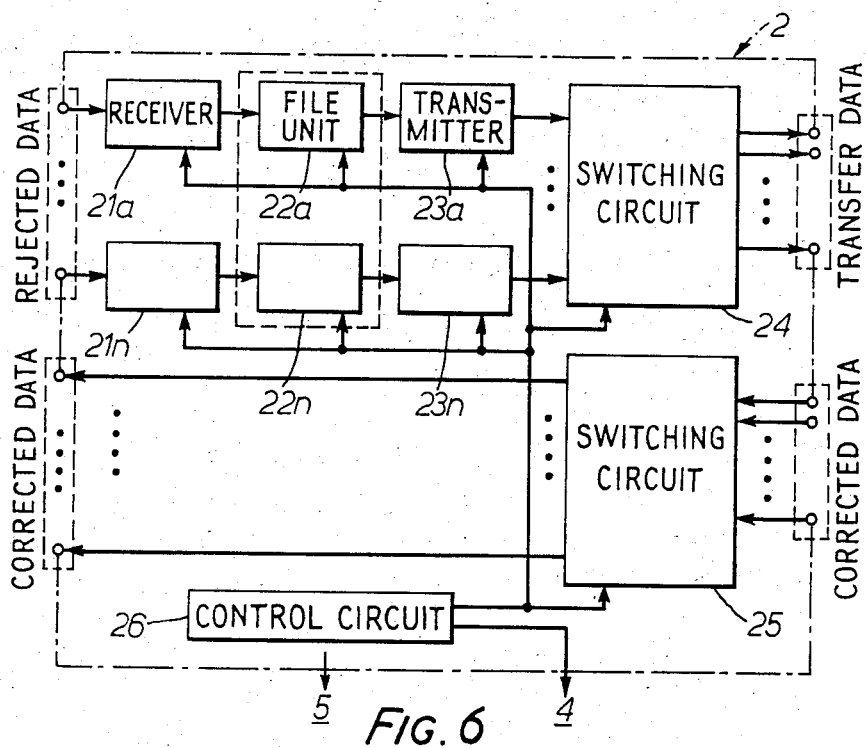
FIG. 6 is a block diagram of distributor 2 in FIG. 1.

FIG. 6 is a block diagram showing an example of distributor 2 in FIG. 1. Receivers 21a, . . . , 21n, file units 22a, . . . 22n and transmitters 23a, . . . 23n correspond to sorters 1a, . . . 1n. Each file unit 22 is a memory for temporarily storing rejected data supplied by the recognition unit of the corresponding mail sorter until assigning controller 4 determines the coding device to which rejected data should be transmitted. Distributor 2 further includes switching circuits 24, 25 and control circuit 26, the operation of which will be described below in connection with the flow charts for distributor 2 and assigning controller 4.

Figure 7:
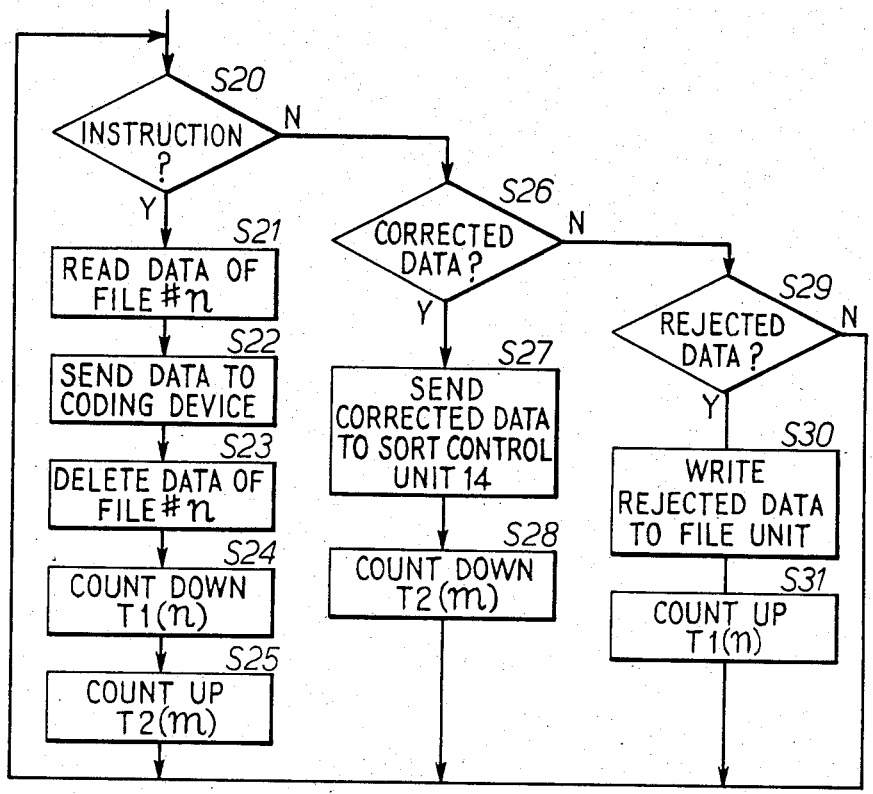
FIG. 7 is a flow chart showing the operation of distributor 2 in FIG. 6.

FIG. 7 is a flow chart showing the operation of distributor 2. At step S20, control circuit 26 determines whether instruction data has been supplied by assigning controller 4. Instruction data includes sorter number SN and coding device number CDN as shown in FIG. 3E. When the instruction data is supplied by assigning controller 4, at step S21, controller circuit 26 supplies a read signal to the file unit and the instruction data to the transmitter corresponding to the SN of the instruction data. For example, when SN and CDN of the instruction data identify sorter 1a and coding device 3b, the read signal is supplied to file unit 22a and a transmit signal is supplied to transmitter 23a. File unit 22a outputs rejected data having the smallest MSN or whose RT to transmitter 23a. Transmitter 23a then generates transfer data consisting of the combination of the rejected data and the instruction data as shown in FIG. 3C. At step S22, control circuit 26 supplies the instruction data to switching circuit 24 which connects transmitter 23a and coding device 3b. Thus, the transfer data output by transmitter 23a is supplied to coding device 3b. Thereafter, at step S23, control circuit 26 supplies a delete signal to file unit 22a. File unit 22a deletes the rejected data just sent to coding device 3b.

Figure 8:
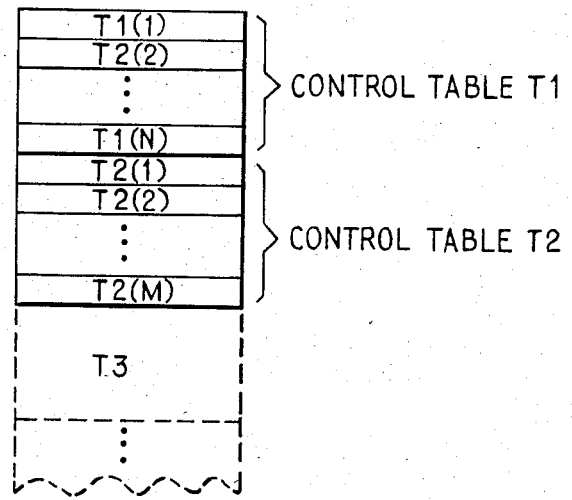
FIG. 8 is a memory map of memory 5 in FIG. 1.

Steps S24 and S25 concern the control tables stored in memory 5 in the manner shown in FIG. 8. According to this embodiment, two control tables T1 and T2 are provided. T1(1), T1(2), . . . , T1(N) of control table T1 correspond to the file units in the distributor where N is the number of mail sorters. T2(1), T2(2), . . . , T2(M) of control table T2 indicate the number of blocks of transfer data received but not processed by the coding devices where M is the number of coding devices. At step S24, as one block of the rejected data is deleted from corresponding file unit (22a), control circuit 26 counts down T1(n) by 1, where n is the corresponding sorter number SN of the instruction data. At step S25, as the transfer data is sent to corresponding coding device (3b), control circuit 26 counts up T2(m) by 1, where m is the corresponding coding device number CDN of the instruction data. The control circuit then returns to step S20.

When instruction data has not been supplied at step S20, control circuit 26 determines whether corrected data has been supplied by one of the coding devices at step S26. The corrected data supplied by one of the coding devices, which includes replacing an input code with correct zip code, replaces the image data in the transfer data. If control circuit 26 receives a control signal from switching circuit 25, indicating that the corrected data has been supplied by a coding device, at step S27, the control circuit returns a send signal to switching circuit 25 to send the corrected data to the mail sorter designated by the SN of the corrected data. At step S28, control circuit 26 receives the CDN of the corrected data from switching circuit 25 and counts down the T2(m) of control table T2 designated by the CDN. Then control returns to step S20.

When the corrected data has not been supplied at step S26, control circuit 26 determines whether rejected data has been supplied by one of the mail sorters at step S29. At step S30, when one of the receivers receives rejected data, it generates a receive signal which enables control circuit 26 to generate and send a write signal to the corresponding file unit to enable the file unit to write the rejected data. Control circuit 26 then counts up T1(n) of control table T1 at step S31 where n identifies the receiver which generated the receive signal. Thus, distributor 2 controls data transfer between the mail sorters and coding devices and also updates the control tables in response to each data transfer.

Figure 9:
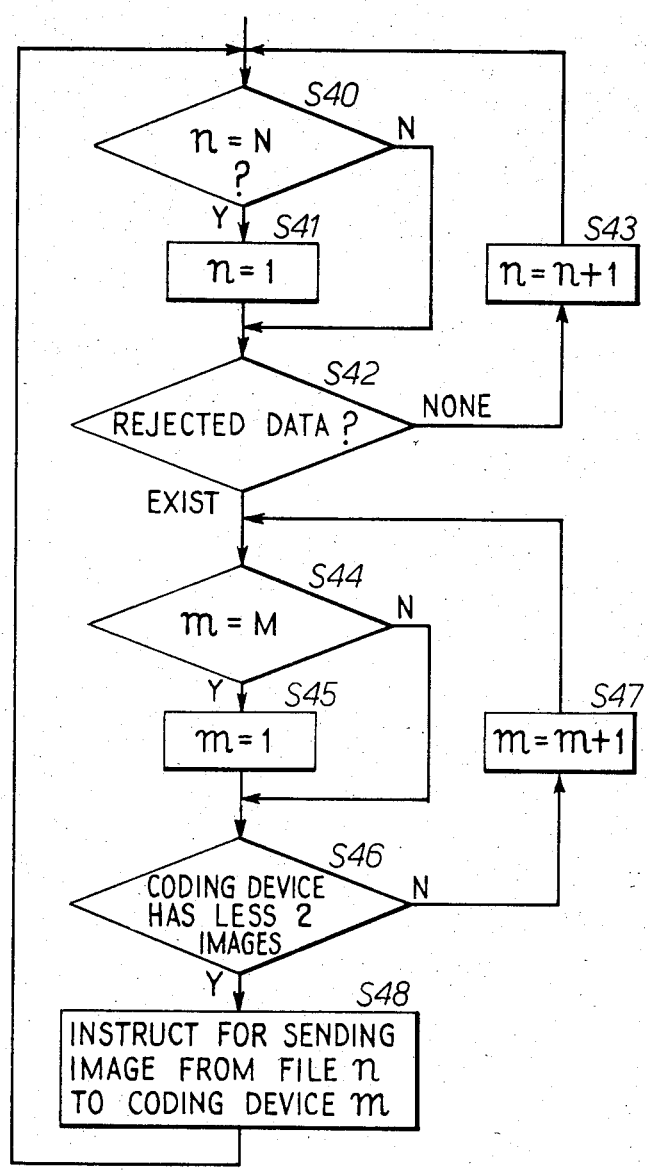
FIG. 9 is a flow chart showing the operation of assigning controller 4 in FIG. 1.

FIG. 9 is a flow chart showing the operation of assigning controller 4 in FIG. 1. In the preferred embodiments, assigning controller 4 is a conventional microcomputer such as a microcontroller chip having internal registers (not shown), one of which is assigned as and SN counter whose content indicates a sorter number SN and another of which is assigned as a CDN counter whose content indicates a coding device number CDN. Steps S40 through S43 form a routine for searching for a file unit whose rejected data should be sent to one of the coding devices. At step S40, the content n of the SN counter is compared with N, i.e., the number of mail sorters. At step S41, if n=N, the content of the SN counter is set at 1, otherwise step S41 is skipped. At step S42, assigning controller 4 reads T1(n) of control table T1 as designated by the content n of the SN counter. If T1(n)=0, that is the n-th file unit has no rejected data, the SN counter is counted up by 1 at step 43 and the above routine is repeated.

If T1(n)>0, that is, the n-th file unit has at least one block of rejected data, assigning controller 4 executes another routine formed by steps S44 through S47 to determine which of the coding devices is available to process the rejected data. At step S44, the content m of the CDN counter is compared with M, i.e., the number of coding devices. At step S45, if m=M, the content of the CDN counter is set at 1, otherwise step S45 is skipped. At step S46, assigning controller 4 reads T2(m) of the control table T2 as designated by the content m of the CDN counter. If T2(m)>2, that is, the m-th coding device has too much unprocessed data, the CDN counter is counted up by 1 at step S47 and the above routine is repeated. If T2(m)≦2, that is the m-th coding device has no unprocessed data or at most 2 unprocessed data, the assigning controller determines that the rejected data in the m-th file unit should be processed by the m-th coding device. At step S48, assigning controller 4 generates instruction data using the contents n,m of the SN and CDN counters and supplies this instruction data to control circuit 26 of distributor 2.

According to the above embodiment of distributor 2, in processing rejected data, the distribution order of file units to coding devices is determined by checking whether untransmitted image data is stored in the file units or not. However, it is even more efficient to distribute rejected data images in the order of read time RT, especially when a few of the mail sorters generate more rejected data than other mail sorters. Thus, FIGS. 10 and 11 show flow charts for an alternative embodiment of distributor 2 and assigning controller 4 in which the distribution order is based on read time RT.

In this case, control table T3 is provided in memory 5 for storing the earliest read time RT for each file unit. FIG. 10 is similar to FIG. 7 except that step S24 is replaced by step S50 and step S31 is deleted. In step S50, the n-th element in control table T3 is updated or renewed by control circuit 26 by writing RT in this element. In this case, RT is the earliest time among rejected image data of the n-th file unit whose rejected data has just been transferred to a coding device at step S22. If there is no rejected data left in the n-th file unit, a predetermined time larger than any expected actual time is written as T3(n). Thus, control circuit 26 always updates or renews control table T3 after sending transfer data to a coding device.

Figure 11:
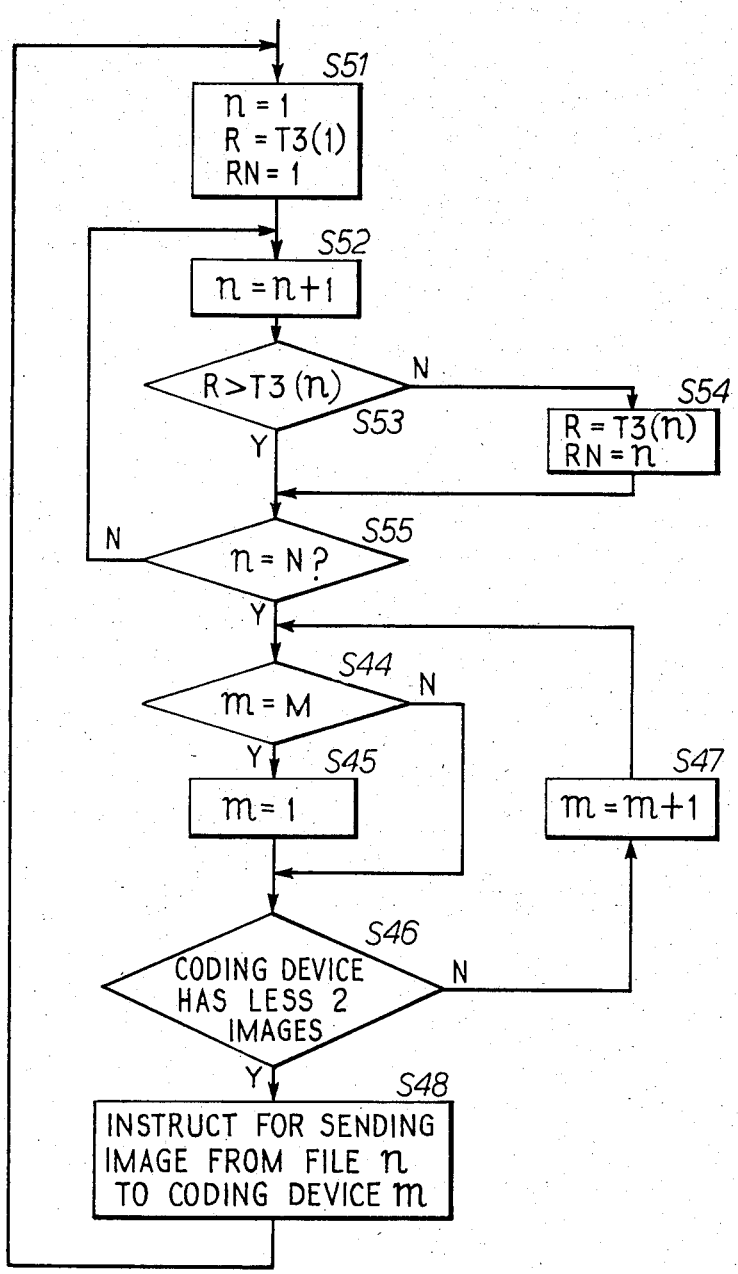
FIG. 11 is another flow chart showing the operation of assigning controller 4.

The flow chart for this second embodiment of assigning controller 4 is shown in FIG. 11. In this embodiment, as compared to the flow chart for the first embodiment shown in FIG. 9, a different routine (steps S51 through S55) for searching a file unit is employed but the same routine is employed for searching a coding device. Again, assigning controller 4 is a microcomputer such as a microcontroller chip with a plurality of internal registers. At first, data is sent to internal registers (not shown) of assigning controller 4, i.e., an SN counter designates the file unit, an R register temporarily stores RT and an RN register stores the SN whose corresponding RT is the earliest in control table T3. At step S51, the SN and RN counters are set to 1 and the first element T3(1) of control table T3 is sent to the R register. The content of the SN counter is incremented by 1 at step S52. Next, at step S53, the n-th element T3(n) of control table T3 is read out from memory 5 and compared with the content of the R register. When T3(n) is smaller, i.e., earlier, than the content of the R register, the content of the R register is replaced by T3(n) and also the content of the RN register is replaced by the content of the SN counter. When T3(n) is larger, i.e., later in time, than the content of the R register, step S54 is skipped. The content of the SN counter is checked at step S55. When it is less than N, steps S52 through S55 are skipped. When the content of the SN counter reaches N, the routine for searching a file unit is completed and the content of the RN register indicates the file unit whose rejected data should be sent to a coding device at that time because its reading time is the earliest among rejected data.

Figures 10, 12:
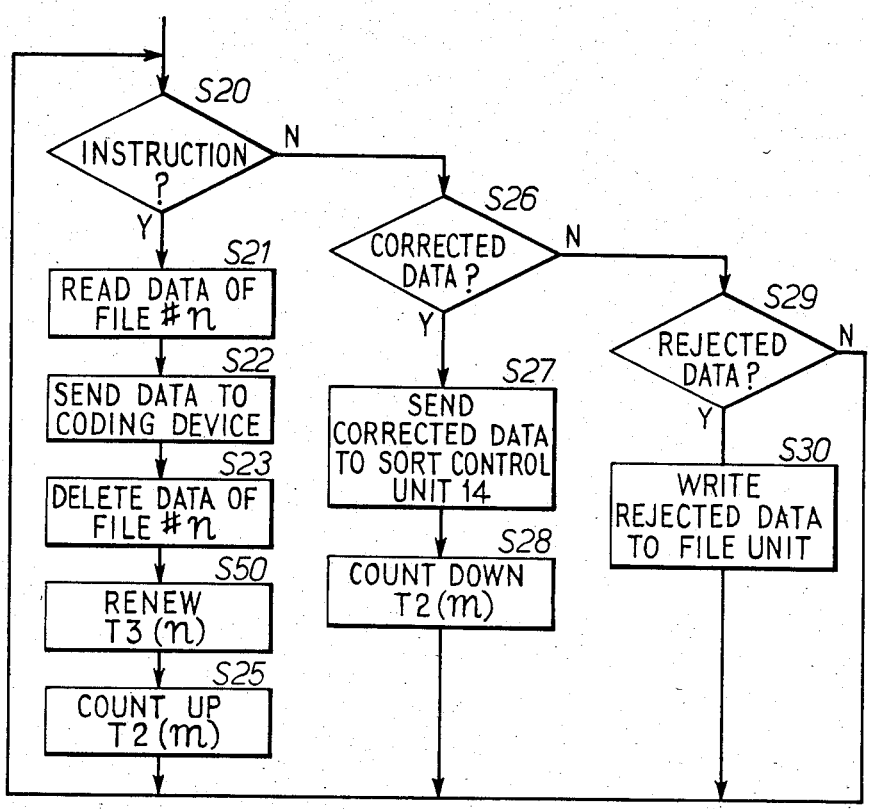
FIG. 10 is another flow chart showing the operation of distributor 2.
FIG. 12 is another example of a control table stored in memory 5.

FIG. 12 shows another embodiment of the control table for assigning coding devices. In this embodiment, the control table is a two-dimensional array in which the amount of rejected data for the n-th sorter is coded by the m-th coding device. This control table can be easily generated and updated by distributor 2. From this control table, assigning controller 4 can easily determine which mail sorter or sorters generate excessive amounts of rejected data or which coding device has very high performance and so on. Thus, for example, when the amount of rejected data from a certain mail sorter in a given period reaches a very high value, assigning controller 4 can assign a high performance coding device to this mail sorter to process excess rejected images before mail reaches sorting section 12.

Although illustrative embodiments of this invention have been described in detail with reference to the accompanying drawings, it is to be understood that the invention is not limited to those precise embodiments. Various changes and modification to these embodiments may be made by one skilled in the art without departing from the scope of spirit of the invention.

We claim:
1. A mail sorting system comprising:
    N number of sorting devices, each sorting device having reading means for obtaining address images of successively conveyed mail, recognition means responsive to said reading means for recognizing the address images and generating destination codes, said recognition means further indentifying address images which cannot be recognized by said recognition means and generating rejected data corresponding to the unrecognized address images, and sorting means for sorting the mail in response to the destination code;
    M number of coding devices, each coding device having monitoring means for displaying the unrecognized address images generated by said recognition means and input means for enabling an operator to input a correct destination code;
    control means coupled between said sorting devices and said coding devices for distributing the rejected data generated by said recognition means to selected coding devices and for transferring the destination code entered by said input means to said sorting means from which the rejected data originated, said control means including control table means for storing and updating a control table containing control information related to the frequency of rejected data in each of said sorting devices and the processing capability of said coding devices, said control means being responsive to the control information in the control table for selectively processing the rejected data to maximize the mail handling capability of said plurality of mail sorters and assigning one of said coding devices to display the rejected data in accordance with the processing capability of said coding devices.

2. A mail sorting system according to claim 1, wherein the rejected data includes read time data indicating the elapsed time for the unrecognized address images.

3. A mail sorting system according to claim 2, wherein said control means further selects the rejected data having the smallest read time.

4. A mail sorting system according to claim 1, wherein the control table in said control table means includes a first table indicating the number of blocks of rejected data generated by each sorting device which have not yet been distributed to coding devices and a second table indicating the number of blocks of rejected data received by each coding device which have not yet been transferred back to said sorting devices with the correct destination code.

* * * * *